Nov. 2, 1954     H. F. ANDERSON     2,693,398

PISTON RING ASSEMBLY AND SUPPORT MEMBERS

Filed July 11, 1950     2 Sheets-Sheet 1

INVENTOR.
HUGO F. ANDERSON
BY
Attorney.

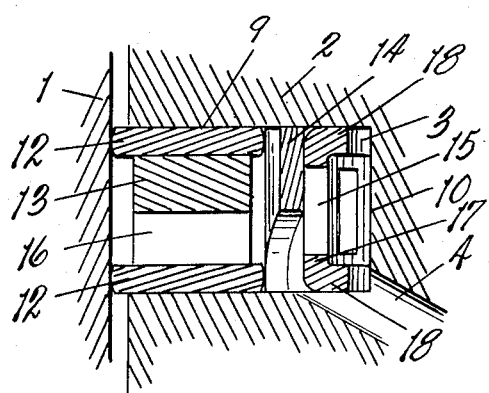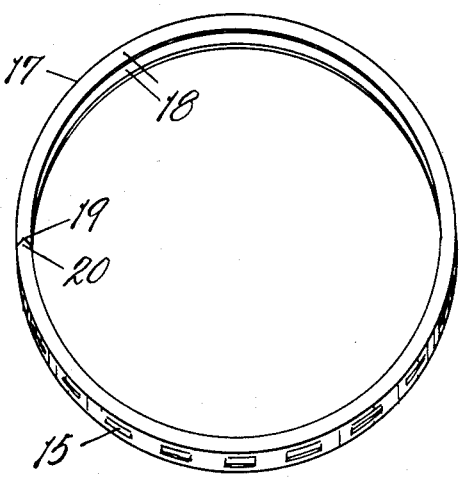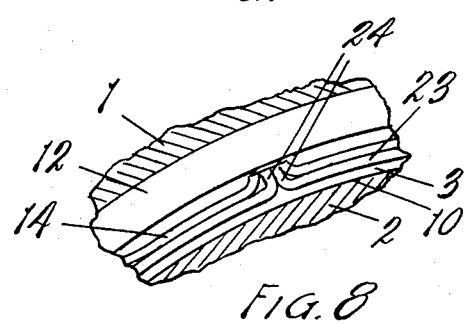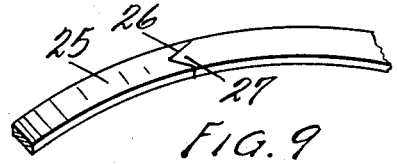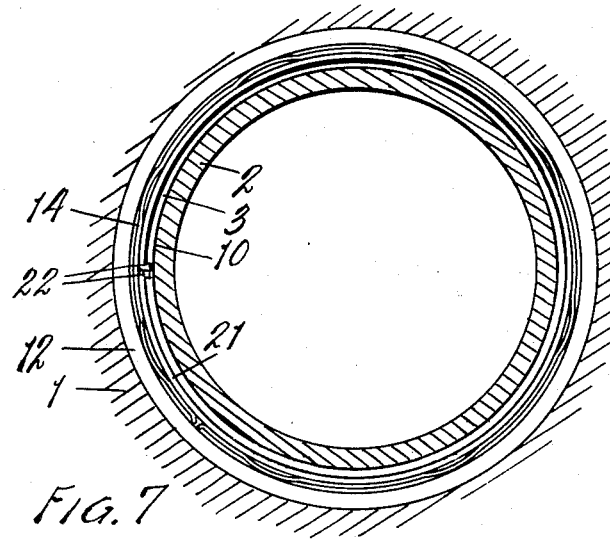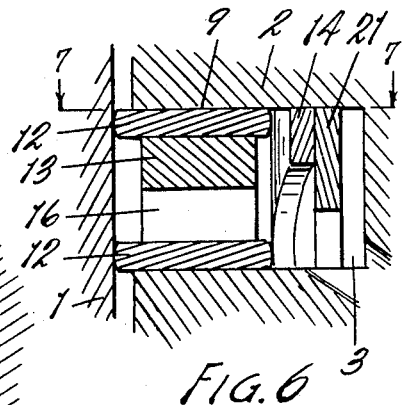

United States Patent Office 2,693,398
Patented Nov. 2, 1954

2,693,398

PISTON RING ASSEMBLY AND SUPPORT MEMBER

Hugo F. Anderson, Hastings, Mich., assignor to Hastings Manufacturing Company, Hastings, Mich.

Application July 11, 1950, Serial No. 173,117

5 Claims. (Cl. 309—45)

This invention relates to improvements in piston ring assemblies and support members.

The main objects of this invention are:

First, to provide a piston ring assembly which may be successfully used in piston ring grooves of a depth exceeding that for which the piston ring unit of the assembly was initially designed.

Second, to provide a piston ring assembly having these advantages which may be assembled in the factory and installed as a unit.

Third, to provide a support for piston ring elements adapted to be installed in piston ring grooves of a depth exceeding that for which the piston ring element or unit coacting with the cylinder wall was primarily designed and which effectively supports such parts in operative relation to the cylinder.

Objects relating to details and economies of the invention will appear from the description to follow. The invention is pointed out in the claims.

A preferred embodiment of the invention is illustrated in the accompanying drawings, in which:

Fig. 4 is a longitudinal section of a piston and coacting cylinder, which I have shown conventionally, with a modified form or embodiment of my invention installed therein.

Fig. 5 is a perspective view of the carrier or support member of modified form.

Fig. 6 is a longitudinal section corresponding to that of Figs. 1 and 4 of a further modified form or embodiment of my invention.

Fig. 7 is a fragmentary sectional view on a line corresponding to line 7—7 of Fig. 6.

Fig. 8 is a fragmentary view illustrating a further modified form or embodiment of my invention.

Fig. 9 is an enlarged fragmentary view of another embodiment of my invention.

In the accompanying drawing I have not attempted to show the parts in their relative proportions or the commercial clearances and tolerances thereof and I have only illustrated my invention as embodied in an oil ring assembly provided with drain openings and the piston ring groove is also provided with drain openings but it should be understood that my invention is adaptable and desirable for use in certain embodiments thereof in any piston ring groove of such radial depth as to render the same desirable.

It is a matter of common experience that piston ring grooves vary greatly in depth particularly in some of the later models of motor vehicle engines. The piston rings designed for original installation are commonly designed for the depth of the particular groove in which they are to be used. One of the main objects of my invention is to provide a piston ring assembly which enables the effective installation of a so-called replacement ring or ring assemblies in such piston ring grooves or in grooves of a depth exceeding that for which they were designed and to enable the standardization of the rings and ring assemblies.

In the accompanying drawing, 1 represents a cylinder and 2 a piston having a piston ring groove 3 therein provided with a drain opening 4. As stated, piston ring grooves vary greatly in depth. The piston ring assembly of my invention comprises an annular support or carrier member designated generally by the numeral 5 and the embodiment of Figs. 1 to 3 of outwardly facing channel section. This member is split at 6 and is formed of ductile metal of uniform thickness, and suitably of the order of .015 of an inch.

Figures 1, 3:
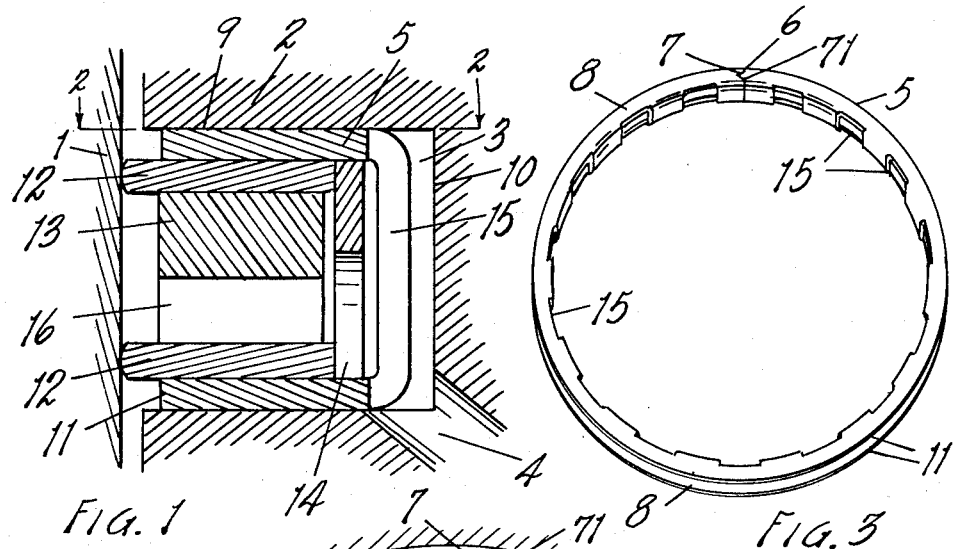
Fig. 1 is a longitudinal section of a piston and coacting cylinder, which are shown conventionally, with the piston ring assembly of my invention installed therein.
Fig. 3 is a perspective view of a preferred form of carrier or support member of my invention.
Figure 2:
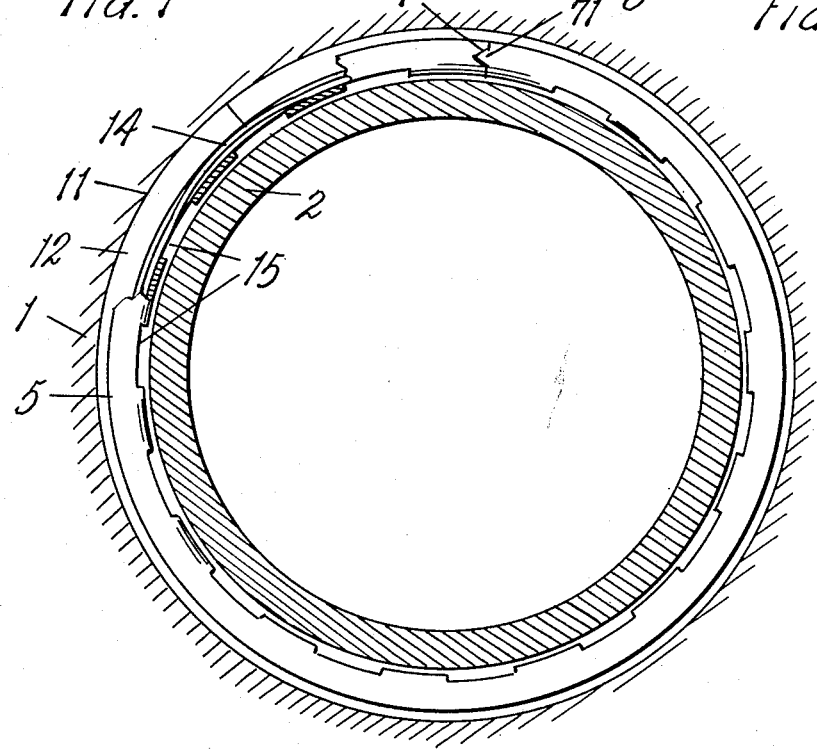
Fig. 2 is a fragmentary sectional view on a line corresponding to line 2—2 of Fig. 1.

The member 5 is disposed within the groove with its ends in abutting relation and with its flanges 8 in side by side supporting relation to the side walls 9 of the piston ring groove. In the embodiments of Figs. 1 to 3 the flanges at one end are provided with V notches 7 the other end being provided with tongues 71. The diameter of the support member substantially exceeds the diameter of the groove at the bottom thereof whereby the support member is supported in spaced relation to the bottom 10 of the groove as shown in Fig. 1. The peripheral edges 11 of the flanges 5 of the support member are within the groove, that is, they do not project from the groove into contacting relation with the cylinder wall. The annular split cylinder wall contacting elements 12 are disposed in axially spaced relation and in side by side supported relation to the flanges of the support member. The spacer 13, shown conventionally, is disposed between the cylinder wall contacting elements 12. The inner ring or expander ring 14 is disposed within the support member in supported relation to the bottom or web thereof and in coacting relation to the cylinder wall contacting elements.

The ring assembly illustrated is designed as an oil ring or for installation in the oil ring groove of a piston and is provided with drain openings 15 in the web thereof. The spacer is provided with openings 16 and it is also split.

The carrier or support member 5 being disposed within the groove with its ends in abutting supporting relation to each other results, in effect, in a new ring groove within the ring groove of the piston and of constant and uniform depth. These carrier support members are designed to receive the ring elements of such radial width as would adapt them to piston ring grooves of the depth for which they were initially designed and also the expander. The support member or carrier can also be used to adapt the ring groove to receive a narrower ring element or ring element assembly, for example, using the material of about .015 thickness for the carrier a 5/32 ring groove would be reduced to 1/8 inch and a 3/16 inch groove to a 5/32 width and the 1/4 inch groove to a 7/32 width. The varying depths of grooves frequently result in undesirale functioning of piston rings depending on inner rings or expanders for accurate and uniform pressure against the cylinder wall.

The embodiment of my invention shown in Figs. 4 and 5 is designed to permit the use of ring assemblies of the full axial width of the piston ring groove. In this embodiment, the carrier or support member 17 is provided with inturned or inwardly directed flanges 18, these being relatively narrow in radial width as compared to the outwardly directed flanges of the embodiments shown in Figs. 1 to 3 inclusive. They serve the purpose, however, of providing a substantially rigid member even when formed of relatively light sheet stock. In this embodiment, the ends of the split element are provided with coacting recesses and tongues 19 and 20 as shown in Fig. 5. In this construction the piston ring elements 12 are in supported engagement with the side walls of the grooves, a spacer 13 being provided as in the preferred embodiment. The carrier or support member serves to support the expander 14 as in the preferred embodiment.

In the embodiment shown in Figs. 6 and 7, the support member 21 is in the form of a flat band or strip and is provided with inturned abutting ends 22, the support member being of such diameter that it is supported in the desired radial spaced relation to the bottom 10 of the groove.

I have illustrated the same piston ring assembly as in the other embodiments or adaptations but it will be understood that any piston ring or ring assembly of proper axial dimensions may be used.

In the embodiment shown in Fig. 8, the support member 23 is provided with outturned abutting lugs 24 which may be disposed between the adjacent ends of the expander 14 as is indicated in Fig. 8 and they may be, if desired, long enough to project between adjacent ends of the split ring elements 12 as illustrated.

In the embodiment shown in Fig. 9, the support member 25 is in the form of a plain annular band, that is, there are no flanges or lug abutments as in the other figures but one end is provided with a notch 26 and the other with a coacting tongue 27 as is illustrated. In the embodiments of Figs. 6 to 9 inclusive, heavier stock may be desirable to prevent flexing than is required in the embodiment of Figs. 1 to 5 inclusive in which the support members are provided with flanges which serve to stiffen the same. In all of the embodiments the support member is in axial supported relation to the walls of the grooves and it is of such diameter that it is supported in spaced relation to the bottom of the groove, providing in effect a false bottom for the groove or a groove of a desired depth to receive and effectively support piston rings or piston ring assemblies which could not be effectively used in the grooves with which the piston is provided.

In applicant's invention the ring elements can be made of uniform radial width and the necessity for numerous special ring elements of various radial width is eliminated and the use also simplifies the installation of the ring assemblies as it avoids the use of depth gauges, groove fillers, and the like.

I have illustrated my invention as embodied in an oil ring but it should be understood that it is adaptable and desirable for use in compression rings, scraper rings and other ring assemblies and it greatly reduces the chances or possibility of an improper or ineffective installation where the grooves are of a depth greater than that for which the ring elements or assembly are designed and it avoids the necessity for the garage or repairmen carrying a stock of rings of widely varying radial dimensions.

It should be understood that the accompanying drawings are largely illustrative and conventionalized for convenience in illustration.

Having thus described my invention, what I claim as new and desire to secure by Letters Patent is:

1. In a piston ring assembly, the combination of a split annular support member of outwardly facing channel section adapted to be disposed in a piston ring groove with its ends in abutting mutually supporting relation and with its flanges in side by side radially slidably supported relation to the side walls of the groove and with their peripheral edges within the side walls of the groove, the support member when so arranged being radially movable in the groove, axially spaced split resilient cylinder wall contacting elements disposed within the support in side by side relation to the flanges thereof and projecting radially outwardly beyond the edges of the flanges, a split annular spacer disposed between said cylinder wall engaging elements, and an expander element arranged within the support member in supported relation thereto to coact with the said cylinder wall engaging elements.

2. In a piston ring assembly, the combination of a split annular support member of outwardly facing channel section adapted to be disposed in a piston ring groove with its ends in abutting relation and with its flanges in radially slidably supported relation to the side walls of the groove, the support member when so arranged being radially movable within the groove, the web of the support member being provided with drain openings, said support member being formed of relatively thin ductile metal, axially spaced split resilient cylinder wall contacting elements disposed within the support in side by side relation to the flanges thereof and projecting radially outward beyond the edges of the flanges, an annular split spacer disposed between said cylinder wall engaging elements and provided with drain openings, and an expander element arranged in said support to coact with the said cylinder wall engaging elements.

3. In a piston ring assembly, the combination of a split annular support member of channel section adapted to be disposed in a piston ring groove with its ends in abutting relation and with its flanges in radially slidably supported relation to the side walls of the groove, the support member when so arranged being radially movable in the groove, said support member being formed of relatively thin ductile metal, axially spaced split resilient cylinder wall contacting elements disposed around the support in side by side relation to the flanges thereof and projecting radially outward beyond the edges of the flanges, an annular split spacer disposed between said cylinder wall engaging elements, and an expander element arranged in said support to coact with the said cylinder wall engaging elements.

4. In a piston ring assembly, the combination of a split annular support member adapted to be disposed in a piston ring groove with its ends in abutting relation, said annular support member being radially movable within the groove, said support member being formed of relatively thin ductile metal, axially spaced split resilient cylinder wall contacting elements disposed around the support, an annular split spacer disposed between said cylinder wall engaging elements, and an expander element supported by said support to coact with the said cylinder wall engaging elements.

5. In a piston ring assembly, the combination of an annular split support member adapted to be disposed in a piston ring groove in radially supported relation to the bottom thereof and with its ends in abutting relation and having coacting tongue and recess engagement, said ends supporting said support member against a reduction in diameter when said ends are in said coacting tongue and recess engagement, the diameter of the support member with its ends in abutting relation exceeding the diameter of the groove at the bottom thereof, whereby the support member is supported in the groove in spaced relation to the bottom thereof, an annular split expansible cylinder wall contacting element disposed radially outwardly of said support member, and an expander element coacting with said cylinder wall contacting element and supported by said support member.

References Cited in the file of this patent

UNITED STATES PATENTS

| Number | Name | Date |
|---|---|---|
| 757,214 | Morison | Apr. 12, 1904 |
| 1,350,849 | Stern | Aug. 24, 1920 |
| 1,942,967 | Marien | Jan. 9, 1934 |
| 1,836,027 | Hellman | Dec. 15, 1931 |
| 2,212,042 | Phillips et al. | Aug. 20, 1940 |
| 2,274,805 | Phillips | Mar. 3, 1942 |
| 2,281,873 | Engelhardt | May 5, 1942 |
| 2,287,707 | Phillips | June 23, 1942 |
| 2,589,154 | Smith | Mar. 11, 1952 |

FOREIGN PATENTS

| Number | Country | Date |
|---|---|---|
| 538,285 | Great Britain | 1941 |